(12) United States Patent     (10) Patent No.: US 12,345,840 B2
Ishida et al.     (45) Date of Patent: Jul. 1, 2025

(54) RADIATION DETECTION APPARATUS, RADIATION IMAGING SYSTEM, AND MANUFACTURING METHOD OF RADIATION DETECTION APPARATUS

(71) Applicant: CANON KABUSHIKI KAISHA, Tokyo (JP)

(72) Inventors: Yohei Ishida, Kanagawa (JP); Shoshiro Saruta, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 18/172,541

(22) Filed: Feb. 22, 2023

(65) Prior Publication Data

US 2023/0273327 A1     Aug. 31, 2023

(30) Foreign Application Priority Data

Feb. 25, 2022    (JP) ................................ 2022-028464

(51) Int. Cl.
    *G01T 1/20*       (2006.01)
    *G01T 1/202*      (2006.01)

(52) U.S. Cl.
    CPC ........ *G01T 1/2023* (2013.01); *G01T 1/20189* (2020.05)

(58) Field of Classification Search
    CPC .......................... G01T 1/2023; G01T 1/20189
    See application file for complete search history.

(56) References Cited

U.S. PATENT DOCUMENTS

| | | | | |
|---|---|---|---|---|
| 4,011,454 | A  * | 3/1977 | Lubowski | .......... C09K 11/0833 250/483.1 |
| 2003/0164453 | A1 * | 9/2003 | Nakata | ..................... G02B 6/06 250/370.09 |
| 2004/0026632 | A1 * | 2/2004 | Struye | ...................... G21K 4/00 250/484.4 |
| 2012/0273685 | A1 * | 11/2012 | Nakatsugawa | ....... G01T 1/2002 250/361 R |
| 2013/0001425 | A1 * | 1/2013 | Nakatsugawa | ..... G01T 1/20183 250/366 |
| 2013/0313667 | A1 * | 11/2013 | Homma | .............. G01T 1/20189 257/428 |
| 2015/0226864 | A1 * | 8/2015 | Sakurai | ............. C09K 11/7733 250/484.4 |
| 2015/0338528 | A1 * | 11/2015 | Honda | .................. G01T 1/2002 427/157 |

(Continued)

FOREIGN PATENT DOCUMENTS

JP       2006052980 A     2/2006

*Primary Examiner* — Hugh Maupin
(74) *Attorney, Agent, or Firm* — Canon U.S.A., Inc. I.P. Division

(57) ABSTRACT

A radiation detection apparatus includes a sensor array in which a plurality of pixels having photoelectric conversion elements is arranged on a substrate, a phosphor layer made of a plurality of columnar crystals provided on the sensor array, a phosphor protective layer provided on the phosphor layer to protect the phosphor layer, and a reflection layer provided on the phosphor protective layer to reflect light from the phosphor layer. The phosphor protective layer is a cross-linked body made of a metallic alkoxide and oxygen cross-linking at least some of metallic atoms included in the metallic alkoxide, and the reflection layer is made of a resin and a metallic compound dispersed in the resin.

10 Claims, 6 Drawing Sheets

(56) References Cited

U.S. PATENT DOCUMENTS

2015/0346358 A1* 12/2015 Arimoto .................. G01T 1/20
250/361 R
2018/0031713 A1* 2/2018 Ojima ...................... G21K 4/00

* cited by examiner

FIG.5

| | PHOSPHOR | | PHOSPHOR PROTECTIVE FILM | REFLECTION LAYER | | | CHARACTERISTICS | |
|---|---|---|---|---|---|---|---|---|
| | AVERAGE FILM THICKNESS (μm) | AVERAGE FILM DENSITY (%) | | METALLIC LAYER | REFLECTION LAYER | INTRODUCTION AMOUNT INTO COLUMNAR CRYSTALS | MTF (2) | INCREASE FROM COMPARATIVE EXAMPLE 1 (%) |
| COMPARATIVE EXAMPLE 1 | 480 | 77 | NONE | PET/Al | TRANSPARENT HOT-MELT 30 μm | 10 μm | 0.355 | — |
| COMPARATIVE EXAMPLE 2 | 480 | 77 | ETHYL SILICATE | PET/Al | TRANSPARENT HOT-MELT 30 μm | 10 μm | 0.365 | 2.8 |
| COMPARATIVE EXAMPLE 3 | 480 | 77 | NONE | PET/Al | TiO2-CONTAINED HOT-MELT 30 μm | 10 μm | 0.410 | 15.5 |
| COMPARATIVE EXAMPLE 4 | 480 | 85 | ETHYL SILICATE | PET/Al | TiO2-CONTAINED HOT-MELT 30 μm | 10 μm | 0.365 | 2.8 |
| EXAMPLE 1 | 480 | 77 | ETHYL SILICATE | PET/Al | TiO2-CONTAINED HOT-MELT 30 μm | 10 μm | 0.450 | 26.8 |
| EXAMPLE 2 | 510 | 77 | ETHYL SILICATE | PET/Al | TiO2-CONTAINED HOT-MELT 30 μm | 10 μm | 0.441 | 24.2 |
| EXAMPLE 3 | 480 | 77 | ETHYL SILICATE | PET/Al | TiO2-CONTAINED HOT-MELT 30 μm | 20 μm | 0.472 | 33.0 |

RADIATION DETECTION APPARATUS, RADIATION IMAGING SYSTEM, AND MANUFACTURING METHOD OF RADIATION DETECTION APPARATUS

BACKGROUND OF THE INVENTION

Field of the Invention

The present disclosure relates to a radiation detection apparatus, a radiation imaging system, and a manufacturing method of a radiation detection apparatus.

Description of the Related Art

At present, radiation detection apparatuses are in widespread use for medical image diagnosis and non-destructive inspection by radiation. In medical image diagnosis, for example, these radiation imaging apparatuses are used in radiographing systems, as general imaging apparatuses that are capable of still-image capturing such as plain imaging or are capable of moving-image capturing such as fluoroscopic imaging. These radiation detection apparatuses are also applied to radiographic analysis and inspection apparatuses for purposes other than medical purposes, such as non-destructive inspection apparatuses.

Used as a phosphor included in a radiation detection apparatus is a cesium iodide (CsI) phosphor doped with a slight amount of thallium iodide (TlI). In order to enhance the use efficiency of fluorescence from such a phosphor to improve the sensitivity, there have been discussed techniques for forming a reflection layer on a phosphor (for example, refer to Japanese Unexamined Patent Application Publication (Translation of PCT Application) No. 2018-513982 and Japanese Patent Application Laid-Open No. 20006-052980).

Japanese Unexamined Patent Application Publication (Translation of PCT Application) No. 2018-513982 discusses a forming radiation detection apparatus in which, as a reflection layer, a resin containing light-scattering particles of titanium oxide ($TiO_2$) or the like is applied to a phosphor layer. Japanese Patent Application Laid-Open No. 20006-052980 discusses a radiation detection apparatus in which a resin containing light-reflective particles is arranged on a phosphor, and the resin is used as a reflection layer and a protective layer.

According to the methods discussed in Japanese Unexamined Patent Application Publication (Translation of PCT Application) No. 2018-513982 and Japanese Patent Application Laid-Open No. 20006-052980, light-scattering particles are used in a reflective layer to obtain the effect of improving the sensitivity of the radiation detection apparatus. However, these literatures provide no particular description as to the improvement of other characteristics of the radiation detection apparatus such as sharpness, and there is demand for further improvement of the characteristics.

SUMMARY OF THE INVENTION

According to an aspect of the present disclosure, a radiation detection apparatus includes a sensor array in which a plurality of pixels having photoelectric conversion elements is arranged on a substrate, a phosphor layer made of a plurality of columnar crystals provided on the sensor array, a phosphor protective layer provided on the phosphor layer to protect the phosphor layer, and a reflection layer provided on the phosphor protective layer to reflect light from the phosphor layer, wherein the phosphor protective layer is a cross-linked body made of a metallic alkoxide and oxygen cross-linking at least some of metallic atoms included in the metallic alkoxide, and wherein the reflection layer is made of a resin and a metallic compound dispersed in the resin.

Further features of the present disclosure will become apparent from the following description of exemplary embodiments with reference to the attached drawings.

BRIEF DESCRIPTION OF THE DRAWINGS

FIG. 5 is a list of examples and comparative examples.

DESCRIPTION OF THE EMBODIMENTS

A radiation detection apparatus and a manufacturing method of the radiation detection apparatus according to an exemplary embodiment of the present disclosure will be described.

Figure 1:
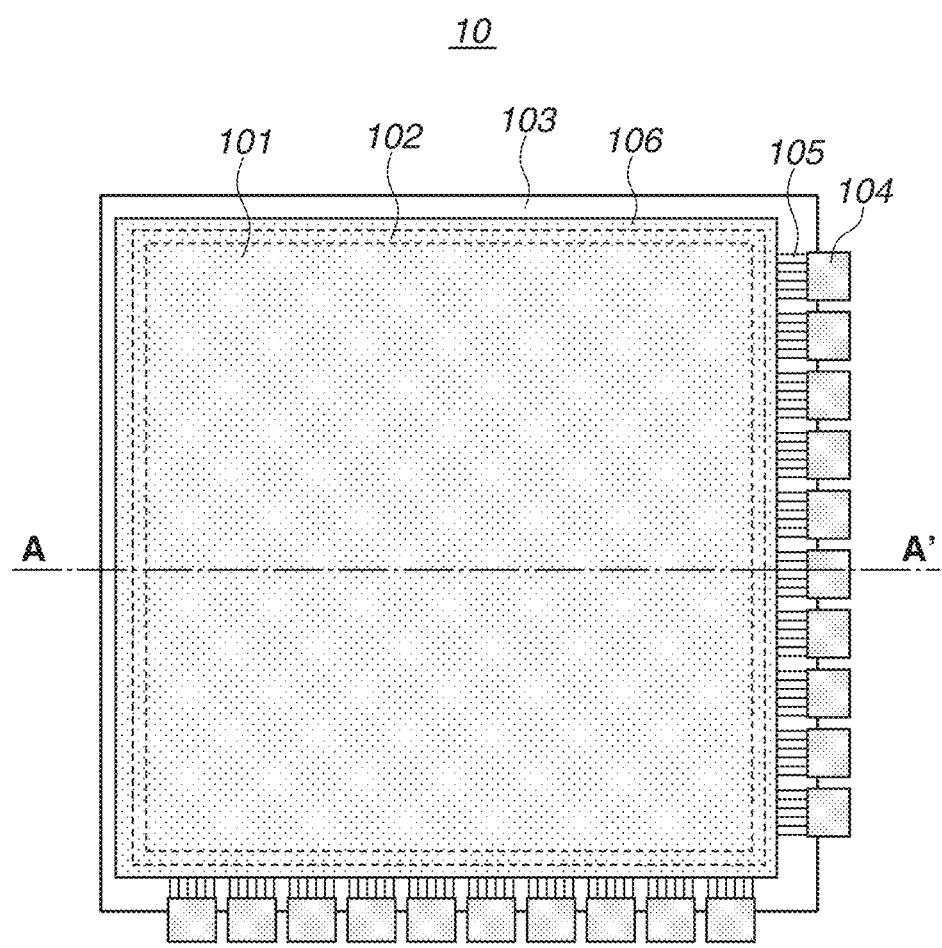
FIG. 1 is a schematic top view of a radiation detection apparatus according to an exemplary embodiment of the present disclosure.
Figure 2:
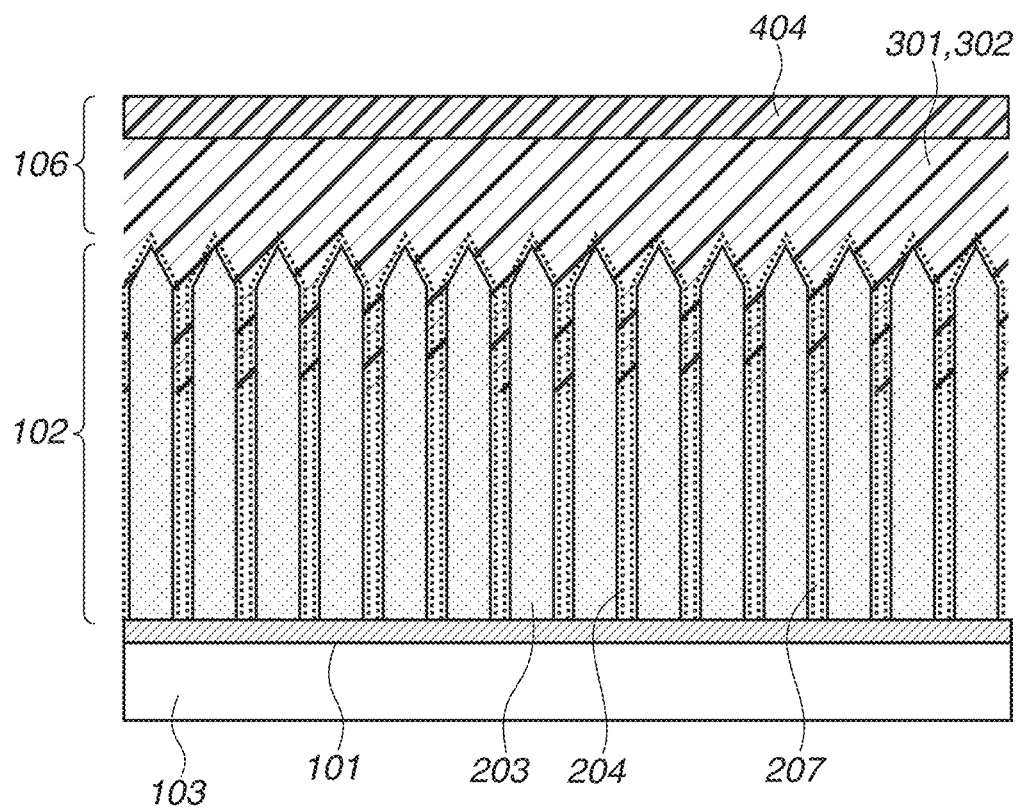
FIG. 2 is a schematic view of a portion of cross section of the radiation detection apparatus according to the exemplary embodiment of the present disclosure.

FIG. 1 is a top view of a radiation detection apparatus 10 in the present exemplary embodiment. FIG. 2 is a cross-sectional view of the central part and its vicinity taken along line A-A' in FIG. 1.

A substrate 103 illustrated in FIG. 1 is a substrate made of glass or plastic. A plurality of pixels is arranged on the substrate 103. The pixels each have photoelectric conversion elements on the substrate 103. A region where the plurality of pixels is arranged will be called a pixel region 101. The substrate 103 provided with the pixel region 101 will be called a sensor array.

In order to transfer a signal detected in the pixel region 101, a plurality of wiring lines 105 and a plurality of connection portions 104 are connected to the pixel region 101 and are arranged at the outer edge of the substrate 103. For the purpose of protecting the pixel region 101, a sensor protective film not illustrated may be arranged on the pixel region 101. The sensor protective film is selectable from among publicly known materials in accordance with the purpose.

In order for the photoelectric conversion elements in the pixel region 101 to convert radiation applied to the radiation detection apparatus 10 into light in a detectable wavelength, a phosphor layer 102 is arranged on the pixel region 101. The phosphor layer 102 includes columnar crystals 203 and a phosphor protective layer 204 formed on the partial or entire surfaces of the columnar crystals 203. The phosphor protective layer 204 is provided to prevent deterioration of the columnar crystals 203, in particular, to prevent deliquescence of the columnar crystals 203 under influence of humidity in the manufacturing process.

Cesium iodide (CsI) is preferably used for the phosphor layer 102. In a more preferred mode, the CsI is doped with an appropriate amount of thallium iodide (TlI) as an activator. This doping allows the CsI to emit light in a visible light range, which makes it easy to detect the light by the photoelectric conversion elements made of amorphous silicon or the like.

The phosphor layer 102 can be formed by any method as far as it is possible to form a structure in which the columnar crystals 203 stand. However, the phosphor layer 102 is preferably formed by an evaporation method. The phosphor layer 102 can be formed with interstices between the columnar crystals 203 by setting film formation conditions and substrate temperature conditions.

Interstices 207 between the columnar crystals 203 are preferably secured at the upper part of the phosphor layer 102 in order to introduce the resin and light-reflection particles of a reflection layer 106 into the interstices 207 as described below. The interstices 207 can be checked for width and the like by using a scanning electron microscopy (SEM), for example.

As an evaluation method of the interstices 207, the film density may be defined. In the present disclosure, the film density is defined as the ratio of volume density of the phosphor layer 102 where the specific gravity of CsI crystals is 100%.

The film density of the phosphor layer 102 with the phosphor protective layer 204 in the present disclosure is preferably within a range of 70 to 85%, more preferably 70 to 80%, as the average of the entire phosphor layer 102. Setting the film density within this range sufficiently ensures the interstices 207 and facilitates introduction of the resin and light-reflection particles of the reflection layer 106 into the upper part of the phosphor layer 102.

Next, the phosphor protective layer 204 will be described. The phosphor protective layer 204 prevents the deliquescence of the columnar crystals 203 and maintains the interstices 207. The material for the phosphor protective layer 204 can be selected from among publicly known materials that are capable of covering the surfaces of the columnar crystals 203 without filling the interstices 207. The material for the phosphor protective layer 204 may be an organic resin or an inorganic thin film, for example.

Suitably used for the phosphor protective layer 204 is a cross-linked body in which a metallic alkoxide and at least some of metallic atoms contained in the metallic alkoxide are cross-linked by oxygen. Such a cross-linked body can be suitably used in the present disclosure because the cross-linked body is capable of covering the surfaces of the columnar crystals 203 without filling the interstices 207.

As the metallic alkoxide included in the cross-linked body suitably used in the present disclosure, the compound expressed by the following general formula (1) can be used:

$$M1(OR)n \quad (1)$$

In the foregoing formula (1), M1 is any of Si, Al, Ti, and Zr, while R is at least one selected from among a methyl group, an ethyl group, a propyl group, an isopropyl group, and a butyl group, where n is 4 if M1 is Si, Ti, or Zr, and n is 3 if M1 is Al. Alternatively, the same advantageous effects can be obtained where M1 is an atom such as P, B, Hf, or Ta.

Besides a metallic alkoxide, the same advantageous effects can be expected with a derivative in which halogen, an amino group, and hydrogen atoms thereof substitute for a metal or a metal to which acetylene is coupled.

The alkoxide contained in the cross-linked compound can be qualitatively analyzed by Fourier transform infrared spectroscopy (FTIR), time-of-flight secondary ion mass spectrometry (TOF-SIMS), or the like, and can be quantitatively analyzed by FTIR, X-ray photoelectric spectroscopy (XPS), or the like.

The film thickness of the phosphor protective layer 204 is preferably 100 nm or less. Since the interstices 207 are 200 nm or more at and around ends of the columnar crystals, setting this film thickness sufficiently secures the interstices 207 between the columnar crystals 203 and fulfils the function of moisture prevention.

Next, the reflection layer 106 will be described. The reflection layer 106 is provided on the phosphor protective layer 204. Used for the reflection layer 106 are a resin 301 containing light-reflective particles 302 and a film (composite film 404) formed by stacking a metal layer and an organic layer. As a material for the resin 301 in the reflection layer 106, a hot-melt resin is suitably used to facilitate introduction of the reflection layer 106 into the interstices 207. Such a structure in which the reflection layer 106 is introduced into the interstices 207 contributes to improvement in the sharpness characteristics of the radiation detection apparatus 10.

The resin 301 used in the reflection layer 106 is not limited to a hot-melt resin and may be selected from among publicly known materials that can contain the light-reflective particles 302.

Figure 3:
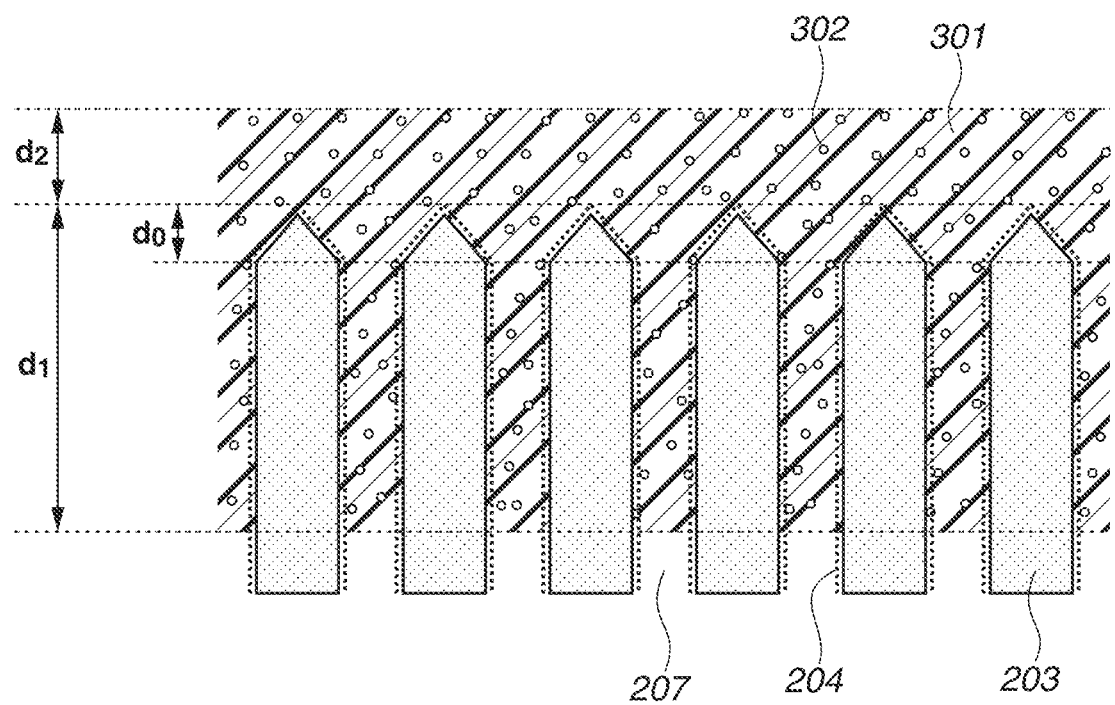
FIG. 3 is a schematic view of a portion of cross section of the radiation detection apparatus according to the exemplary embodiment of the present disclosure.

Next, a structure of the columnar crystals 203 and the reflection layer 106 will be described in detail with reference to FIG. 3. The resin 301 containing the light-reflective particles 302 is introduced into the interstices 207 and arranged to fill the interstices 207 at the upper part of the columnar crystals 203.

The resin 301 is suitably a hot-melt resin that contains a polyolefin resin low in moisture absorptivity as the main component, for example. The hot-melt resin is defined as an adhesive resin that contains no water or solvent and is solid at ambient temperature, and is made of an absolutely nonvolatile thermoplastic material.

The hot-melt resin has the properties of melting with a rise in the resin temperature and solidifying with a decrease in the resin temperature. The hot-melt resin is a resin that is adhesive to other organic materials and inorganic materials in heated and melted states. On the other hand, the hot-melt resin is solidified and is not adhesive at ordinary temperatures. By not containing polar solvent medium, solvent, or water, the hot-melt resin does not dissolve the columnar crystals 203 even when in contact with the columnar crystals 203, and can also have the function of protecting the columnar crystals 203.

Hot-melt resins are classified according to the type of a base polymer (base material) as the main component. In the present exemplary embodiment, the hot-melt resin may be based on polyolefin, polyester, or polyamide. For the hot-melt resin, it is important to select a material that is high in moisture-proof property and is high in light transmittance to pass visible light rays emitted from a phosphor.

The hot-melt resin for use in the present exemplary embodiment can be formed by the method described below, for example.

A resin is dissolved into a mixed solvent medium of toluene and xylene, and the viscosity is adjusted to approximately 10 cps. Then, light-reflective particles are dispersed together with a dispersant in advance in a mixed liquid of butanol and propanol. The dispersion liquid is sufficiently disintegrated by a ball mill and is added to the solvent medium such that the light-reflective particles accounts for 0 to 32 vol % of the resin. After blending and sufficient stirring, the solvent is volatilized taking care about foaming. According to this method, the resin 301 can be obtained as a hot-melt resin.

Next, the light-reflective particles 302 for use in the present exemplary embodiment will be described. The light-reflective particles 302 are dispersed and mixed in the resin 301. The resin 301 containing the light-reflective particles 302 reflects the light from the phosphor layer 102. Specifically, the resin 301 has the function of reflecting, out of the light from the columnar crystals 203 constituting the phosphor layer 102, light of a component in the direction opposite to the pixel region 101, and returning part of the reflected light toward the pixel region 101. This achieves effective use of fluorescence generated by the phosphor layer 102, which contributes to reduction in the dose of radiation applied to the subject at the time of radiographic imaging using the radiation detection apparatus.

The material for the light-reflective particles 302 may be white pigment particles that reflect visible light, for example. However, any known material can be used, regardless of organic material or inorganic material, as far as the material fulfils the function of light reflection when contained in a resin. If the resin 301 used is a hot-melt resin containing the light-reflective particles 302, a metallic compound is suitably used as the light-reflective particles 302, for example. Specific example may be rutile-type titanium dioxide particles.

Figure 4A:
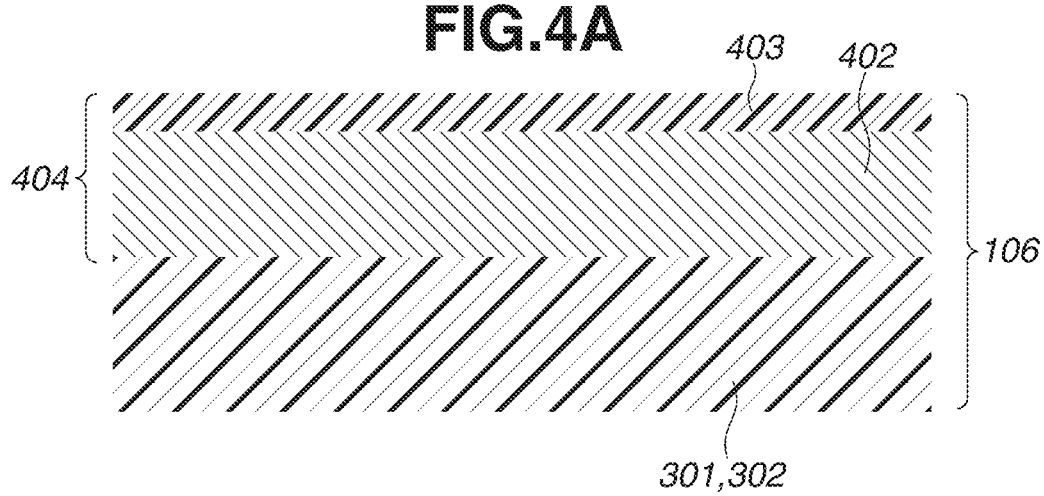
FIGS. 4A, 4B, and 4C are schematic diagrams illustrating an example of a manufacturing method of the radiation detection apparatus according to the exemplary embodiment of the present disclosure.

A method for forming the reflection layer 106 will be described with reference to FIGS. 4A to 4C. First, as illustrated in FIG. 4A, a composite film 404 is prepared by stacking a metallic layer 402 that includes a film made of aluminum or the like and an organic resin film 403 that includes an organic film made of polyethylene terephthalate (PET) or polyester. The resin 301 such as a hot-melt resin is formed on the composite film 404. In this manner, the reflection layer 106 is formed such that the organic resin film 403, the metallic layer 402, and the resin 301 are stacked in this order.

A method for forming the resin 301 on the composite film 404 in the case of using a hot-melt resin as the resin 301 will be described. For example, the composite film 404 in roll form is set to a roll coater apparatus, and is coated with a hot-melt resin prepared in advance. According to this method, the thickness of the resin 301 can be preferably adjusted by the viscosity at the time of preparation of the hot-melt resin or by the coating speed. This method makes it possible to adjust the thickness of the resin 301 in the case of using a hot-melt resin as the resin 301 in a range of 5 to 100 μm.

Figure 4B:
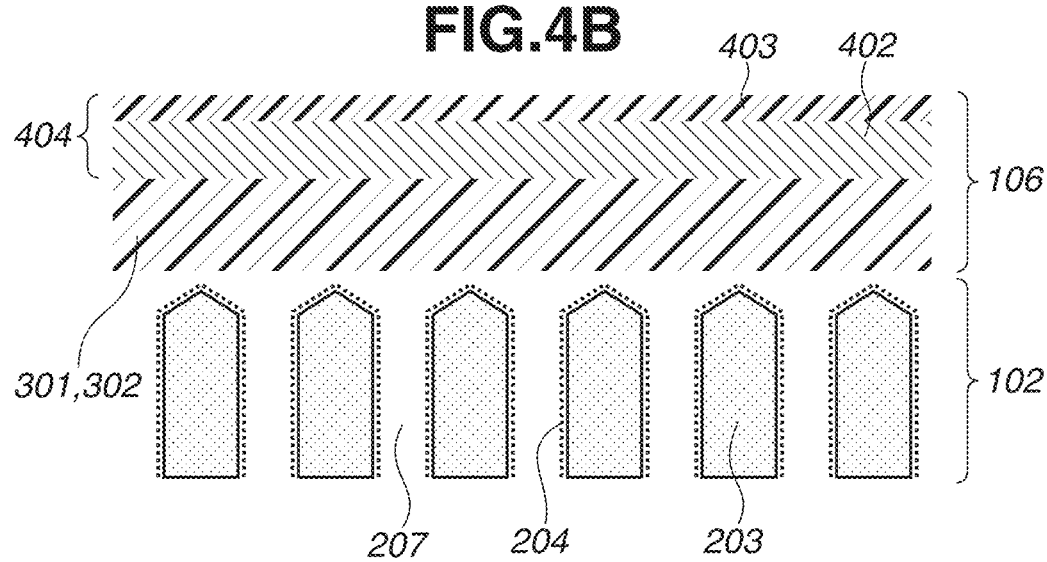
Figure 4C:
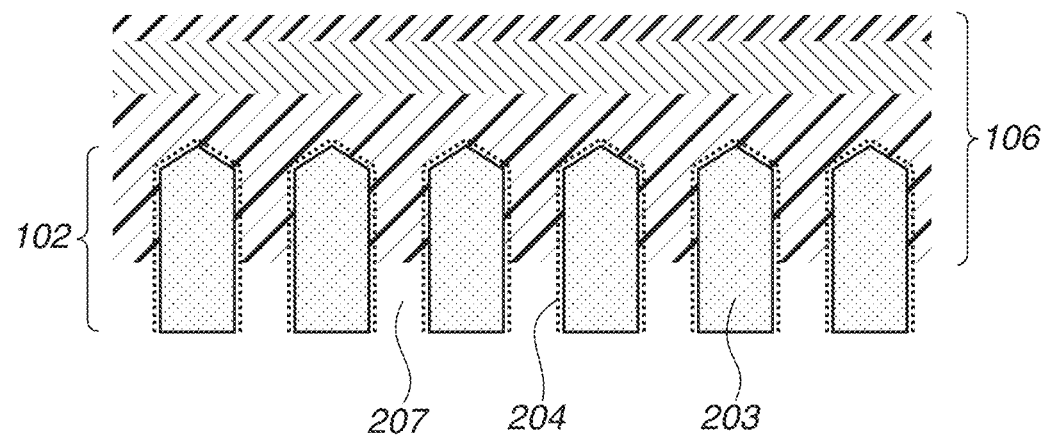

Then, as illustrated in FIG. 4B, the resin 301 in the reflection layer 106 formed as illustrated in FIG. 4A and the distal ends of the columnar crystals 203 in the phosphor layer 102 are arranged to be in contact with each other. Thereafter, as illustrated in FIG. 4C, the resin 301 is melted by thermocompression bonding to introduce the resin 301 into the interstices 207 between the columnar crystals 203 constituting the phosphor layer 102.

Returning to FIG. 3, the introduction of the resin 301 containing the light-reflective particles 302 into the interstices 207 will be described.

In the present exemplary embodiment, forming the phosphor protective layer 204 on the surfaces of the columnar crystals 203 suppresses the deliquescence of the columnar crystals 203. The columnar crystals could change in surface shape with progress of deliquescence so that the interstices 207 may reduce due to fusion bonding of the columnar crystals 203. Since the phosphor protective layer 204 has the function of suppressing the deliquescence of the columnar crystals 203, the columnar crystals 203 with the phosphor protective layer 204 do not fuse and bond together, so that the interstices 207 are maintained. This facilitates introduction of the resin 301 and the light-reflective particles 302 constituting the reflection layer 106 into the interstices 207.

Intrusion amount d1 of the resin 301 needs to be greater than a height d0 of conical portions forming the apexes of the columnar crystals 203. Setting the intrusion amount d1 to be greater than the height d0 maintains the adhesion between the phosphor layer 102 and the resin 301 while maintaining the characteristics of the phosphor layer 102 and the resin 301. In the present exemplary embodiment, the value of d0 falls within a range of approximately 1 to 15 μm. The value of d1 is set in a range in which the columnar crystals 203 can keep the shape and do not reduce the sensitivity and sharpness characteristics.

In the case of forming the reflection layer 106 by thermocompression bonding as described above, setting the value of d1 in a range of 1 to 50 μm allows the resin 301 containing the light-reflective particles 302 in the reflection layer 106 to efficiently reflect the light from the phosphor layer 102, thereby preferably improving the sensitivity and sharpness characteristics.

The reflection layer 106 needs to be formed with a certain thickness (d2) on the columnar crystals 203. The value of d2 falls within a range of approximately 1 to 50 μm. Setting the value of d2 in this range allows efficient reflection of the fluorescence from the columnar crystals 203, thereby maintaining or improving the sensitivity of the radiation detection apparatus 10.

As the results of the inventor's earnest examinations, it has been revealed that introducing the resin 301 containing the light-reflective particles 302 into the interstices 207 between the columnar crystals 203 formed on the surface of the phosphor protective layer 204 contributes to improvement in the sharpness characteristics of the radiation detection apparatus 10. These results will be described below in relation to examples and comparative examples.

Next, a manufacturing method of the radiation detection apparatus 10 of the present disclosure will be described.

First, a sensor array in which a plurality of pixels with photoelectric conversion elements is formed in array is prepared on the substrate 103 made of glass or plastic. The sensor array may have a sensor panel protective layer formed of an inorganic material or an organic material. Subsequently, the wiring lines 105 and the connection portions 104 connected to the photoelectric conversion elements are arranged at the outer edge of the sensor array in order to extract outputs from the pixels.

Next, the phosphor layer 102 is formed on the sensor array. The phosphor layer 102 is made of a plurality of columnar crystals standing together on the sensor array. The formation area of the phosphor layer 102 contains the pixel region 101 formed by the plurality of pixels as illustrated in FIG. 1.

A method for forming the phosphor layer 102 can be an evaporation method by which the material for the phosphor layer 102 is heated and evaporated in vacuum, for example, to form a film on the sensor array. The shape of the columnar crystals 203 and the magnitude of the interstices 207 can be controlled by setting the film forming conditions at the time of evaporation and the temperature conditions of the substrate on which a film is to be formed.

The material for the phosphor layer 102 is a material that mainly emits light in a visible light region when being irradiated with radiation. Specifically, CsI is preferably used, and a slight amount of TlI is added to the CsI as an activator for the purpose of light emission in the visible light region. Using the evaporation method described above makes it possible to simultaneously heat the CsI and TlI into co-evaporation and control the amount of TlI to be added to the CsI.

Next, the phosphor protective layer 204 is formed on the partial or entire surfaces of the columnar crystals 203 in the phosphor layer 102 illustrated in FIG. 2. Used for the phosphor protective layer 204 are at least a metallic alkoxide and a cross-linked body in which some of metallic atoms of the metallic alkoxide are cross-linked by oxygen. The cross-linked body appropriately activated is brought into contact with the columnar crystals 203 in the phosphor layer 102 to form the phosphor protective layer 204. The metallic alkoxide is preferably a compound represented by the general formula (1) described above, for example. A suitable example is ethyl silicate.

Next, the reflection layer 106 is prepared. The resin 301 containing the light-reflective particles 302 illustrated in FIG. 3 is formed on the composite film 404 made of an organic film and a metallic film, for example. The resin 301 is formed by preparing the composite film 404 in roll form and coating the composite film 404 with the resin 301 using a roll coater. Before the coating, the light-reflective particles 302 are mixed into the resin 301. The film thickness of the reflection layer 106 can be controlled by controlling the viscosity of the resin 301 to be applied and the coating speed.

Next, the reflection layer 106 is arranged on the phosphor layer 102 on which the phosphor protective layer 204 is formed. Then the reflection layer 106 is thermally compressed and bonded at a temperature equal to or higher than the softening point of the resin 301. As a result of the thermocompression bonding, the resin 301 thermally softened and deformed is introduced into the interstices 207 together with the light-reflective particles 302 contained in the resin 301 as illustrated in FIG. 4C.

The amount of intrusion of the reflection layer 106 into the interstices 207 can be controlled by setting parameters such as the viscosity of the resin 301 constituting the reflection layer 106, the concentration of the light-reflective particles 302, pressure and temperature at the time of thermocompression bonding.

In Example 1, the phosphor protective layer was formed on the phosphor layer made of columnar crystals and a hot-melt resin containing titanium-oxide particles was formed on the phosphor layer via the phosphor protective layer, thereby producing a radiation detection apparatus.

First, a sensor array was prepared by forming a plurality of pixels with photoelectric conversion elements in array on the substrate 103 made of glass. A sensor protective film was formed on the sensor array to protect the photoelectric conversion elements.

Next, the phosphor layer 102 was formed on the sensor protective film. The phosphor layer 102 was formed so as to cover the pixel region 101 in which the pixels are formed. In this example, the phosphor layer 102 was formed by an evaporation method, from cesium iodide to which an appropriate amount of thallium iodide was applied as an activator.

The phosphor layer 102 with the interstices 207 secured between the columnar crystals 203 can be formed by setting the film formation conditions and the substrate temperature conditions. In this example, the film thickness of the phosphor layer 102 was 480 µm, and the concentration of the thallium was 0.7 mol %.

Next, the phosphor protective layer 204 was formed on the columnar crystals 203 constituting the phosphor layer 102. The phosphor protective layer 204 was formed on the surfaces of the columnar crystals 203 by bringing appropriately activated ethyl silicate into contact with the columnar crystals 203.

After the formation of the phosphor protective layer 204, the average column diameter of the columnar crystals 203 and the width of the interstices 207 were measured using a scanning electron microscope. The average diameter of the columnar crystals 203 was approximately 6 um, and the width of the interstices 207 was approximately 1 to 4 µm. As a method for evaluating the interstices 207, the film density was measured. The film density of the phosphor layer 102 with the phosphor protective layer was 77% on average.

Next, a stacked body of a PET film to be used as the reflection layer 106, an aluminum film, and the resin 301 (hot-melt resin) containing the light-reflective particles 302 was prepared. In this example, rutile-type titanium dioxide particles were used as the light-reflective particles 302.

In this example, the average size of the rutile-type titanium dioxide particles was 250 nm, the particle size distribution was 10% D=195 µm, 50% D=245 µm, and 90% D=275 µm. The hot-melt resin and the light-reflective particles 302 were mixed so as to keep the particles within a range of 0 to 32 Vol % of the resin. As for the layer thicknesses of the reflection layer 106, the PET film was 10 um, the aluminum film was 30 um thick, and the hot-melt resin layer was 30 um thick.

Next, the reflection layer 106 and the phosphor layer 102 were bonded with each other. The hot-melt resin side of the reflection layer 106 and the distal end side of the columnar crystals 203 of the phosphor layer 102 were faced to each other. The sheet size of the reflection layer 106 was made larger than the size of the region with the phosphor layer 102 such that the phosphor layer 102 was sealed by the reflection layer 106 and the region of the outer peripheral part of the substrate 103 without the phosphor layer 102.

The phosphor layer 102 and the reflection layer 106 were bonded by thermocompression bonding. After heating of the substrate 103, the phosphor layer 102, and the reflection layer 106 up to the hot-melt melting temperature, the reflection layer 106 was pressurized to introduce the melted hot-melt resin into the interstices 207 and bond the resin to the interstices 207. The thermocompression bonding was also performed on the entire phosphor layer 102 and the glass portion of the outer peripheral part of the substrate 103 with the phosphor layer 102, thereby bonding the hot-melt resin and the substrate to seal the phosphor layer 102 inside.

Next, an electric substrate was mounted on the substrate 103 and a casing was added to the substrate 103 to produce the radiation detection apparatus 10. As the result of evaluation of sharpness properties (modulation transfer function (MT)) of the radiation detection apparatus 10, MTF(2) was 0.45 as shown in FIG. 5, whereby it can be confirmed that favorable MTF characteristics have been obtained.

FIG. 5 also shows Example 2 in which the film thickness of the phosphor was changed. When the film thickness of the phosphor was 510 um, MTF(2) was 0.44.

Example 3 has the same configuration as Example 1 except that the amount of introduction of a reflection layer into columnar crystals was changed. FIG. 5 shows the evaluation results. In this example, MTF(2) was 0.47.

In Comparative Example 1, instead of the hot-melt resin containing the light-reflective particles in Example 1, a hot-melt resin that contained no light-reflective particles and transparent to visible light was used, and no phosphor protective layer was formed. In this case, the hot-melt resin merely functioned as an adhesion layer, not as a reflection layer, and transmitted the light emitted by the phosphor. An aluminum sheet functioned as a reflection layer in place of the hot-melt resin. The radiation detection apparatus was manufactured by a method similar to that in Example 1 except for the above-mentioned points.

As the MTF characteristics of the radiation detection apparatus produced in this comparative example, MTF(2) was 0.355 as shown in FIG. 5.

In Comparative Example 2, instead of the hot-melt resin containing light-reflective particles in Example 1, a hot-melt resin that contained no light-reflective particles and was transparent to visible light was used. In this case, as in Comparative Example 1, an aluminum sheet functioned as a reflective layer. Unlike in Comparative Example 1, a phosphor protective layer was formed. The radiation detection apparatus was manufactured by a method similar to that in Example 1 except for the above-mentioned points.

As the MTF characteristics of the radiation detection apparatus produced as this comparative example, MTF(2) was 0.365 as shown in FIG. 5.

Comparative Example 3 is an example in which a radiation detection apparatus was produced by a method similar to that in Example 1 except that no phosphor protective layer was used. Specifically, immediately after the formation of a phosphor layer, a reflection layer is mounted on the phosphor layer without forming a phosphor protective layer. The radiation detection apparatus is manufactured by a method similar to that in Example 1 except for the above-mentioned points.

As the MTF characteristics of the radiation detection apparatus produced in this comparative example, MTF(2) was 0.410 as shown in FIG. 5.

Comparative Example 4 is an example in which a radiation detection apparatus was produced by a method similar to that in Example 1 except that a formation condition of a phosphor layer was changed and the phosphor layer was produced with a change in film density. The film density of the phosphor layer in this comparative example was 85% as shown in FIG. 5, which was lower than that in Example 1. The radiation detection apparatus was manufactured by a method similar to that in Example 1 except for the above-mentioned point.

As the MTF characteristics of the radiation detection apparatus produced in this comparative example, MTF(2) was 0.365 as shown in FIG. 5.

From these examples and comparative examples shown in FIG. 5, it can be estimated that the effect of improving MTF characteristics of the phosphor protective layer using ethyl silicate in the configuration of Comparative Example 1 will be 2.8% (Comparative Example 2). In addition, it can be estimated that the effect of improving the MTF characteristics in the case of using $TiO_2$-contained hot-melt resin as a reflection layer in the configuration of Comparative Example 1 will be 15.5% (Comparative Example 3).

On the other hand, the effect of improving the MTF characteristics was 26.8% in the configuration of Example 1, that is, the configuration in which ethyl silicate was used for the phosphor protective layer and $TiO_2$-contained hot-melt resin was used for the reflection layer. It can be seen that this value is higher than the value obtained by multiplying the effects estimated from Comparative Examples 2 and 3 (MTF(2) was 0.422, and the effect of MTF improvement was 18.7%).

As described above, the inventor's earnest studies have revealed that simultaneously adopting a phosphor protective layer and a reflection layer made of a resin containing light-reflective particles would be more highly effective in MTF improvement than in the case of separately adopting a phosphor protective layer and a reflection layer made of resin containing light-reflective particles.

<Other Exemplary Embodiments>

Figure 6:
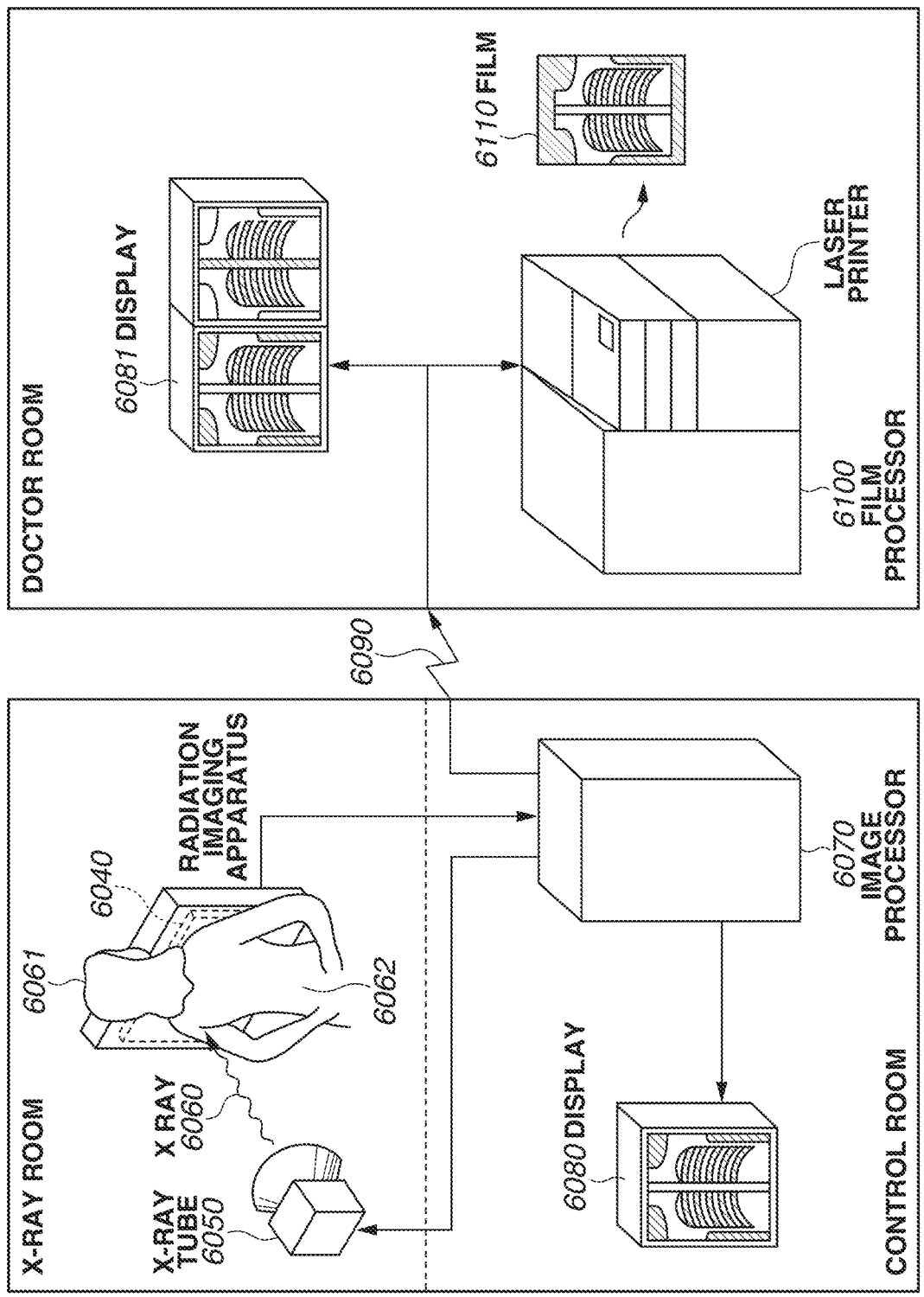
FIG. 6 is a schematic diagram illustrating an example in which the radiation detection apparatus according to the exemplary embodiment of the present disclosure is applied to a radiation imaging system.

Hereinafter, description will be provided with reference to FIG. 6 as to an example of application of the radiation detection apparatus 10 according to the exemplary embodiment of the present disclosure to a radiation imaging system. An X ray 6060 generated in an X-ray tube 6050, which is a radiation source, passes through chest 6062 of a patient or subject 6061, and enters a radiation detection apparatus 6040 that is typified by the radiation detection apparatus 10 described above.

The incident X ray contains information about the inside of the body of the subject 6061. In response to the incidence of the X ray, a scintillator emits light. The light is subjected to photoelectric conversion by a photoelectric conversion element to obtain electric information.

This information is digitized and subjected to image processing as a radiation image by an image processor 6070 that is an image processing unit, so that the processed image can be observed on a display 6080 that is a display unit in a control room.

This information can also be remotely transferred by a transmission processing unit such as a telephone line 6090. Accordingly, the information can be displayed on a display 6081 that is a display unit in another place such as a doctor room or can be saved in a recording unit such as an optical disc so that a doctor in a remote location can perform a diagnosis. Alternatively, the information may be recorded on a film 6110, which is a recording medium by a film processor 6100 that is a recording unit.

The radiation detection apparatus 10 of the present disclosure is also applicable to radiographic analysis and inspection apparatuses for other than medical purposes, such as non-destructive inspection apparatuses, and manufacture thereof.

According to the exemplary embodiments of the present disclosure, it is possible to provide a radiation detection apparatus that has high sharpness characteristics.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-028464, filed Feb. 25, 2022, which is hereby incorporated by reference herein in its entirety.

What is claimed is:

1. A radiation detection apparatus comprising:
   a sensor array in which a plurality of pixels having photoelectric conversion elements is arranged on a substrate;
   a phosphor layer made of a plurality of columnar crystals provided on the sensor array;
   a phosphor protective layer provided on the phosphor layer to protect the phosphor layer; and
   a reflection layer provided on the phosphor protective layer to reflect light from the phosphor layer,
   wherein the phosphor protective layer is a cross-linked body made of a metallic alkoxide and oxygen cross-linking at least some of metallic atoms included in the metallic alkoxide, and wherein the reflection layer, made of a resin dispersed with a metallic compound, intrudes into interstices between columnar crystals within a range of 1 to 50 μm, from distal ends of the columnar crystals toward the sensor array.

2. The radiation detection apparatus according to claim 1, wherein the metallic alkoxide is a compound represented by the following formula:

$$M1(OR)n,$$

where M1 is selected from the group consisting of Si, Al, Ti, and Zr, R is at least one selected from the group consisting of a methyl group, an ethyl group, a propyl group, an isopropyl group, and a butyl group, n is 4 in a case where M1 is Si, Ti, or Zr, and n is 3 in a case where M1 is Al.

3. The radiation detection apparatus according to claim 1, wherein the reflection layer has a metallic layer, and
wherein the resin and the metallic compound are provided between the metallic layer and the phosphor layer.

4. The radiation detection apparatus according to claim 1, wherein the resin is a hot-melt resin.

5. The radiation detection apparatus according to claim 1, wherein the metallic compound is a rutile-type titanium dioxide.

6. The radiation detection apparatus according to claim 1, wherein the plurality of columnar crystals is made of cesium iodide.

7. The radiation detection apparatus according to claim 1, wherein the plurality of columnar crystals includes thallium iodide as an activator.

8. The radiation detection apparatus according to claim 1, wherein the phosphor layer has a film density in a range of 70 to 85%.

9. A radiation imaging system comprising:
the radiation detection apparatus according to claim 1; and
an image processing unit configured to process radiation detected by the radiation detection apparatus as a radiation image.

10. A manufacturing method of a radiation detection apparatus, comprising:
forming a phosphor layer made of a plurality of columnar crystals on a sensor array in which a plurality of pixels having photoelectric conversion elements is arranged on a substrate;
forming a phosphor protective layer on the phosphor layer to protect the phosphor layer; and
forming a reflection layer on the phosphor protective layer to reflect light from the phosphor layer,
wherein the forming of the phosphor protective layer includes forming the phosphor protective layer as a cross-linked body made of a metallic alkoxide and oxygen cross-linking at least some of metallic atoms included in the metallic alkoxide, and
wherein the forming of the reflection layer includes introducing a resin, dispersed with a metallic compound, into interstices between columnar crystals through thermocompression bonding.

* * * * *